United States Patent
Wu et al.

(10) Patent No.: US 9,466,985 B2
(45) Date of Patent: Oct. 11, 2016

(54) CONTROL METHOD FOR FUEL CELL POWER

(71) Applicant: CHUNG-HSIN ELECTRIC & MACHINERY MFG. CORPORATION, Taoyuan Hsien (TW)

(72) Inventors: Yi-Fan Wu, Taoyuan Hsien (TW); Ruiming Zhang, Taoyuan Hsieng (TW); Shuhai Quan, Wuhan (CN); Rui Quan, Wuhan (CN)

(73) Assignee: Chung-Hsin Electric & Machinery Mfg. Corp., Taoyuan Hsien (TW)

( * ) Notice: Subject to any disclaimer, the term of this patent is extended or adjusted under 35 U.S.C. 154(b) by 770 days.

(21) Appl. No.: 13/888,982

(22) Filed: May 7, 2013

(65) Prior Publication Data

US 2013/0293016 A1    Nov. 7, 2013

(30) Foreign Application Priority Data

May 7, 2012  (CN) .......................... 2012 1 0138991

(51) Int. Cl.
| | |
|---|---|
| H02J 4/00 | (2006.01) |
| H01M 8/04 | (2016.01) |
| G06F 1/30 | (2006.01) |
| H02J 9/06 | (2006.01) |
| G06F 1/26 | (2006.01) |

(52) U.S. Cl.
CPC ................. *H02J 4/00* (2013.01); *G06F 1/263* (2013.01); *G06F 1/30* (2013.01); *H01M 8/04373* (2013.01); *H01M 8/04425* (2013.01); *H01M 8/04626* (2013.01); *H01M 8/04738* (2013.01); *H01M 8/04753* (2013.01); *H01M 8/04768* (2013.01); *H01M 8/04776* (2013.01); *H01M 8/04925* (2013.01); *H01M 8/04955* (2013.01); *H02J 9/061* (2013.01); *Y02B 90/14* (2013.01); *Y02E 60/50* (2013.01); *Y10T 307/615* (2015.04)

(58) Field of Classification Search
CPC ............................ G06F 1/30; H01M 8/04955
See application file for complete search history.

(56) References Cited

U.S. PATENT DOCUMENTS

| | | | | |
|---|---|---|---|---|
| 6,787,259 B2 * | 9/2004 | Colborn | ............ | H01M 8/04559 429/430 |
| 7,250,231 B2 * | 7/2007 | Edlund | ............. | H01M 8/04014 307/66 |
| 8,539,914 B2 * | 9/2013 | Kerns | ..................... | F02B 43/12 123/1 A |
| 8,597,839 B2 * | 12/2013 | Kanazu | .................. | C01B 3/384 429/423 |
| 2012/0169127 A1 * | 7/2012 | Lin | ................... | H01M 8/04955 307/66 |

\* cited by examiner

*Primary Examiner* — Thienvu Tran
*Assistant Examiner* — Pinping Sun

(57) ABSTRACT

A power controlling method for a power supplying system coupled to a load is disclosed. City energy is detected. It is determined whether the city energy corresponds to a first pre-determined condition. When the city energy corresponds to the first pre-determined condition, the city energy is transformed to generate a main power to the load. When the city energy does not correspond to the first pre-determined condition, a fuel cell unit is activated to provide a backup power to the load.

9 Claims, 13 Drawing Sheets

CONTROL METHOD FOR FUEL CELL POWER

CROSS REFERENCE TO RELATED APPLICATIONS

This Application claims priority of China Patent Application No. 201210138991.0, filed on May 7, 2012, the entirety of which is incorporated by reference herein.

BACKGROUND OF THE INVENTION

1. Field of the Invention

The invention relates to a power control method, and more particularly to a power control method, which provides power when city energy is unstable.

2. Description of the Related Art

When a conventional power supply system drives a load, the conventional power supply system transforms city energy to power required by the load. However, the conventional power supply system cannot normally drive the load when the city energy is unstable, such as power trip or power failure. Thus, the load cannot normally operate. If the load is an important device, such as a base station or a fileserver, it is inconvenient to transmit information when the load cannot normally operate.

BRIEF SUMMARY OF THE INVENTION

A power controlling method for a power supplying system coupled to a load is provided. An exemplary embodiment of a power controlling method for a power supplying system is described in the following. A city energy is detected. It is determined whether the city energy corresponds to a first pre-determined condition. The city energy is transformed to generate a main power to the load when the city energy corresponds to the first pre-determined condition. A fuel cell unit is activated to provide a backup power to the load when the city energy does not correspond to the first pre-determined condition.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
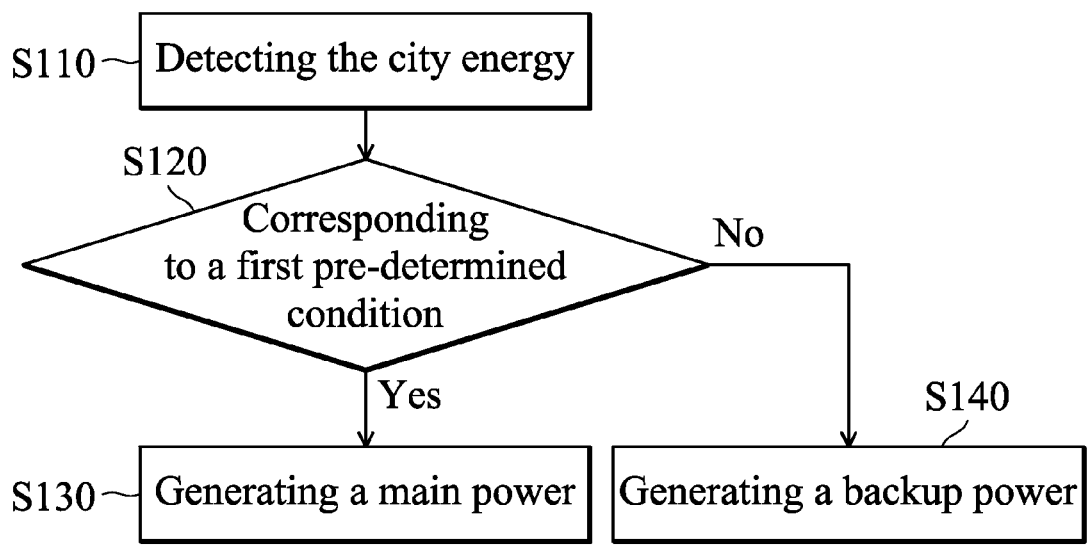
FIG. 1 is a schematic diagram of an exemplary embodiment of a power controlling method.

FIG. 1 is a schematic diagram of an exemplary embodiment of a power controlling method. The power controlling method is applied to a power supplying system. In this embodiment, the power supplying system drives a load according to city energy.

First, the city energy is detected (step S110) and then it is determined whether the city energy corresponds to a first pre-determined condition (step S120). When the city energy corresponds to the first pre-determined condition, it represents that the city energy is stable. Thus, the city energy is transformed to generate a main power to the load (step S130). However, when the city energy does not correspond to the first pre-determined condition, it represents that the city energy is unstable. Thus, a backup power is provided to the load (step S140).

In this embodiment, a fuel cell unit is utilized to generate the backup power. The invention does not limit the types of the main power and the backup power. In one embodiment, each of the main power and the backup power is an AC type or a DC type.

Figure 2A:
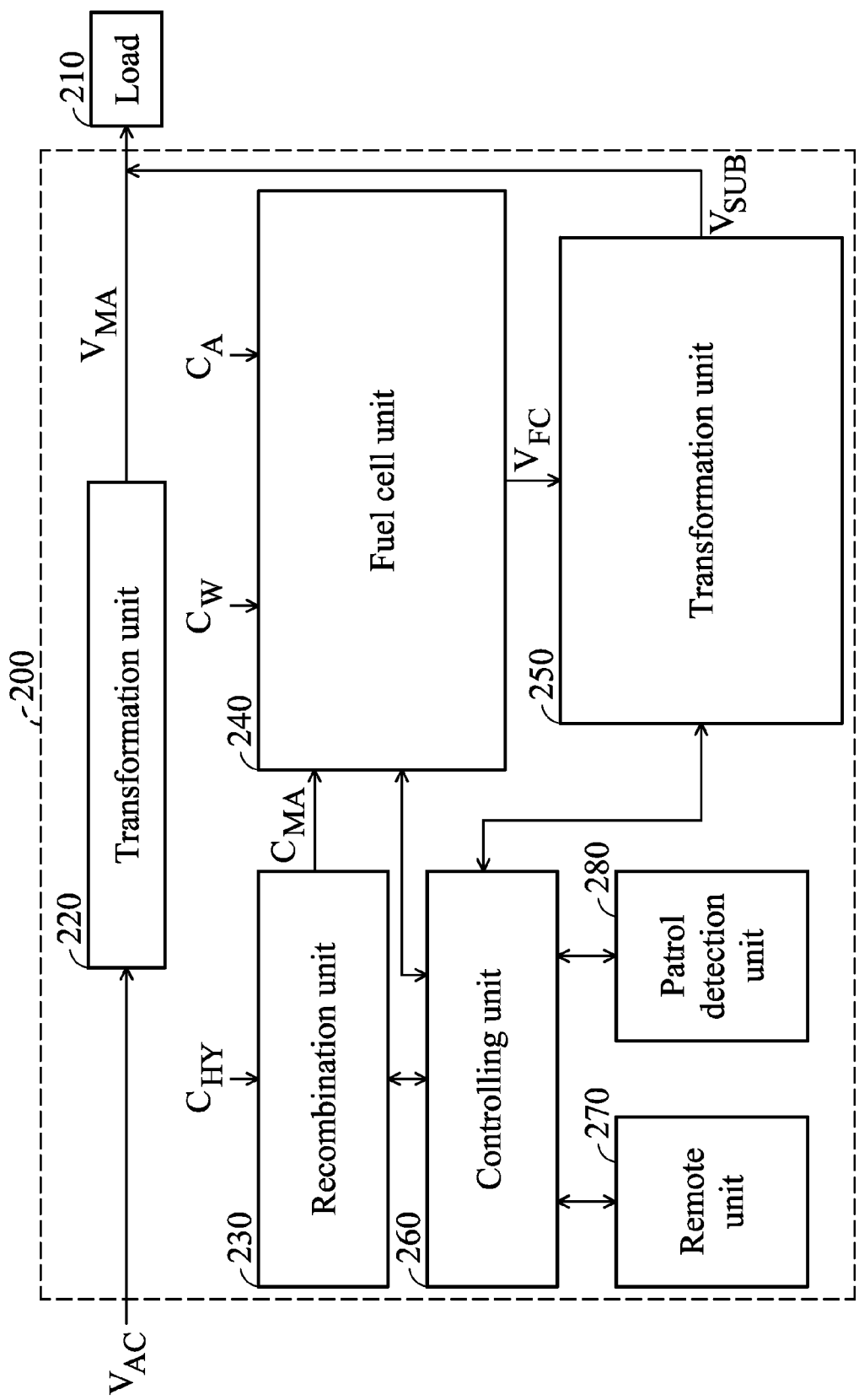
FIG. 2A is a schematic diagram of an exemplary embodiment of a power supplying system.

FIG. 2A is a schematic diagram of an exemplary embodiment of a power supplying system. The power supplying system 200 provides power to the load 210 and comprises a transformation unit 220, a recombination unit 230, a fuel cell unit 240, a power transformation unit 250 and a controlling unit 260.

The transformation unit 220 generates the main power $V_{MA}$ to drive the load 210 according to the city energy $V_{AC}$. The invention does not limit the circuit structure. Any circuit structure can serve as the transformation unit 220, as long as the circuit structure is capable of generating power according to the city energy. In one embodiment, the transformation unit 220 is a transformer.

The recombination unit 230 recombines a methanol component $C_{HY}$ to generate a hydrogen component $C_{MA}$. The fuel cell unit 240 generates a power $V_{FC}$ according to the hydrogen component $C_{MA}$, a water component $C_W$ and an air component $C_A$. The power transformation unit 250 transforms the power $V_{FC}$ to generate a backup power $V_{SUB}$ to the load 210. The controlling unit 260 controls operations of the recombination unit 230, the fuel cell unit 240 and the power transformation unit 250 to immediately provide the backup power $V_{SUB}$ to the load 210 when the city energy $V_{AC}$ is unstable.

In this embodiment, the power supplying system 200 further comprises a remote unit 270 and a patrol detection unit 280. The controlling unit 260 transmits operation status of each unit to a remote terminal via the remote unit 270. Thus, a remote user is capable of monitoring the operation status of the power supplying system 200.

Additionally, the patrol detection unit 280 detects the voltage of each fuel cell of the fuel cell unit 240. The controlling unit 260 adjusts and controls each unit (e.g. 230, 240 and 250) according to the detection result generated by the patrol detection unit 280.

Figure 2B:
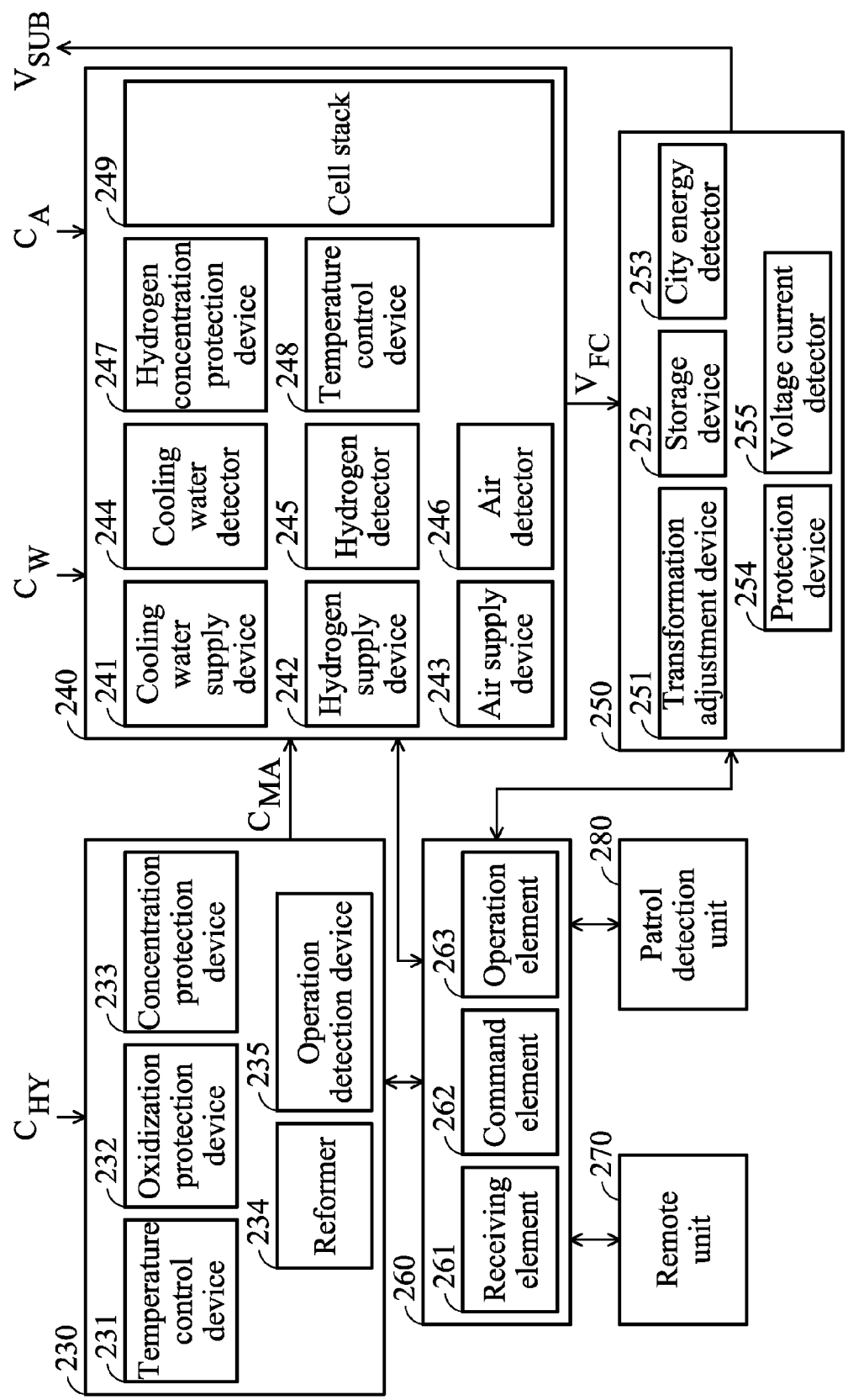
FIG. 2B is a schematic diagram of an exemplary embodiment of a port of the power supplying system shown in FIG. 2A.

FIG. 2B is a schematic diagram of an exemplary embodiment of a port of the power supplying system shown in FIG. 2A. The recombination unit 230 comprises a temperature control device 241, an oxidization protection device 232, a concentration protection device 233, a reformer 234 and an operation detection device 235, but the disclosure is not limited thereto. Any circuit can serve as the recombination unit 230, as long as the circuit is capable of recombining the methanol to generate the hydrogen and executing control of the recombination action The temperature control device 231 controls the internal temperature of the recombination unit 231. The oxidization protection device 232 avoids the situation where the reformer 234 is oxidized. The concentration protection device 233 avoids the situation where the internal hydrogen concentration of the recombination unit 230 is too high. The reformer 234 recombines the methanol component $C_{HY}$ and generates the hydrogen component $C_{MA}$. The operation detection device 235 detects the operation statuses of the temperature control device 231, the oxidization protection device 232, the concentration protection device 233 and the reformer 234 and notifies the controlling unit 260 of the detection results. In this embodiment, the temperature control device 231, the oxidization protection device 232, the concentration protection device 233 and the operation detection device 235 make the reformer 234 operate at an optimum status.

The fuel cell unit 240 comprises a cooling water supply device 241, a hydrogen supply device 242, an air supply device 243, a cooling water detector 244, a hydrogen detector 245, an air detector 246, a hydrogen concentration protection device 247, a temperature control device 248 and a cell stack 249, but the disclosure is not limited thereto. Any circuit structure can serve as the fuel cell unit 240, as long as the circuit structure is capable of generating power according to a hydrogen component, a water component and an air component.

In this embodiment, the cooling water supply device 241 provides cooling water to the cell stack 249. The hydrogen supply device 242 provides hydrogen to the cell stack 249. The air supply device 243 provides air to the cell stack 249. The cell stack 249 generates the power $V_{FC}$ according to the cooling water, the hydrogen and the air. In this embodiment, the cooling water and the air come from external and the hydrogen is provided by the recombination unit 230.

The cooling water detector 244 detects the providing status of the cooling water supply device 241 and notifies the controlling unit 260 of the detection result. The hydrogen detector 245 detects the providing status of the hydrogen supply device 242 and notifies the controlling unit 260 of the detection result. The air detector 246 detects the providing status of the air supply device 243 and notifies the controlling unit 260 of the detection result. The hydrogen concentration protection device 247 avoids the situation where the internal hydrogen concentration of the fuel cell unit 240 is too high. The temperature control device 248 controls the internal temperature of the fuel cell unit 240.

In one embodiment, the fuel cell unit 240 comprises a plurality of detection devices (not shown) to detect the status (e.g. a temperature status, a pressure status and a liquid status) of the fuel cell unit 240. The controlling unit 260 controls the hydrogen concentration device 247 and the temperature control device 248 according to the detection results generated by the detection devices. In other embodiments, the hydrogen concentration device 247 and the temperature control device 248 controls the hydrogen concentration and the temperature of the fuel cell unit 240 according to the detection results generated by the detection devices.

The power transformation unit 250 comprises a transformation adjustment device 251, a storage device 252, a city energy detector 253, a protection device 254 and a voltage current detector 255, but the disclosure is not limited thereto. In another embodiment, any circuit structure can serve as the power transformation unit 250, as long as the circuit structure is capable of transforming power.

The transformation adjustment device 251 transforms the power $V_{FC}$ and generates the backup power $V_{FC}$ according to the transformed result. The storage device 252 stores power. The city energy detector 253 determines whether the city energy $V_{AC}$ is stable. The protection device 254 protects the cell stack 249. The voltage current detector 255 detects the power $V_{FC}$ and provides the detection result to the controlling unit 260.

The controlling unit 260 comprises a receiving element 261, a command element 262 and an operation element 263, but the disclosure is not limited thereto. In other embodiments, any circuit structure can serve as the controlling unit 260, as long as the circuit structure is capable of generating a corresponding control signal according to the detection results generated by the detectors.

The receiving element 261 receives the detection results generated by the detectors in the recombination unit 230, the fuel cell unit 240 and the power transformation unit 250 and transforms each detection result into an appropriate value according to the specification of each detector. The operation element 263 executes a determining action and an operation according to the transformation results generated by the receiving element 261. The command element 262 controls the corresponding unit to activate, de-activate or adjust the operation of each element according to the determining result.

Figure 3:
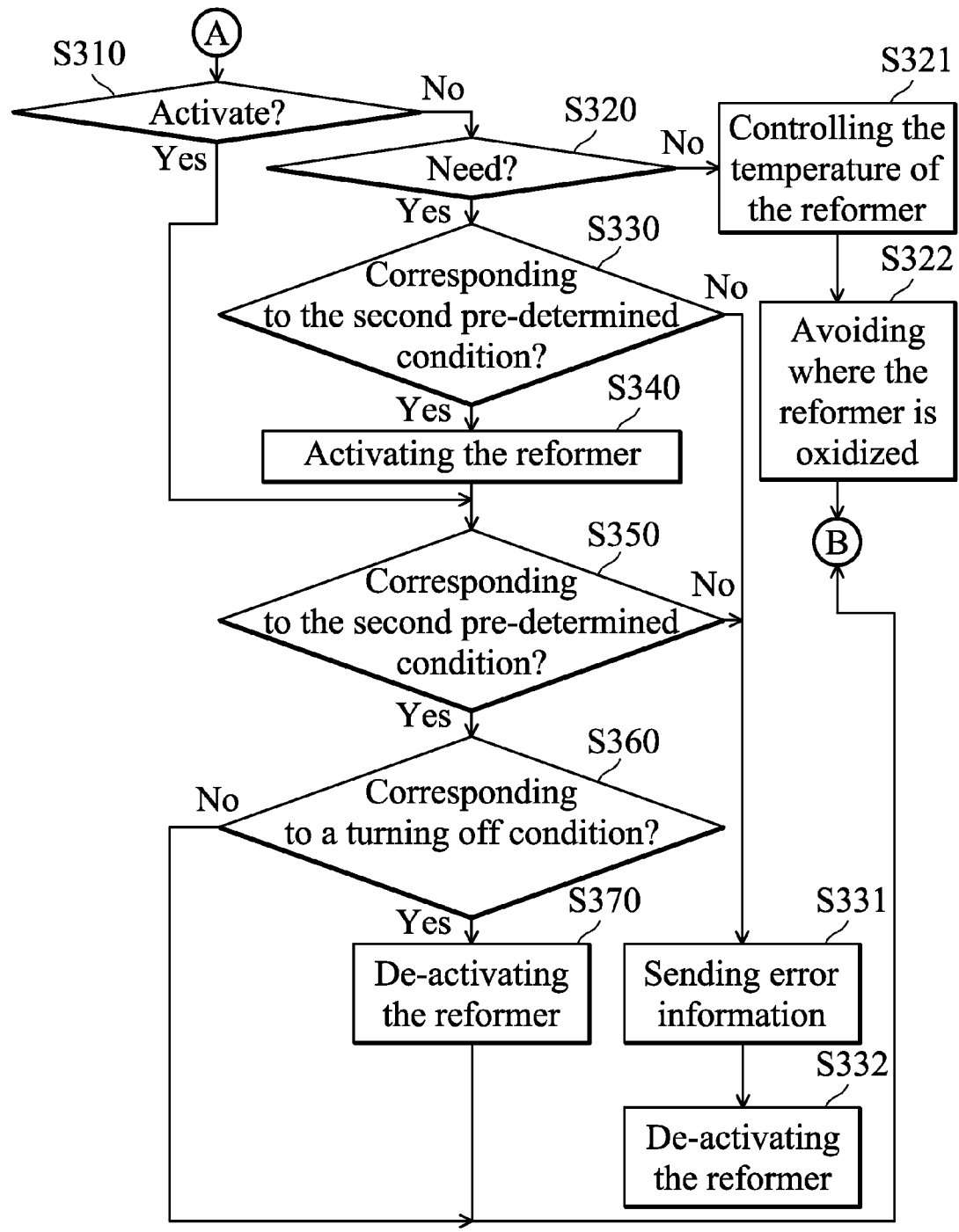
FIG. 3 is a schematic diagram of an exemplary embodiment of a recombination confirmed action.

When the power supplying system operates in a standby mode, a pre-turning on mode and an operation mode, a recombination confirmed action is executed to confirm that the recombination unit 230 is normal. FIG. 3 is a schematic diagram of an exemplary embodiment of a recombination confirmed action. First, it is determined whether a reformer of the power supplying system has been activated (step S310). When the reformer has been activated, it is determined whether an operation status of the reformer corresponds to a second pre-determined condition (step S350). In one embodiment, in step S350 is to determine at least one of the temperature of the reformer, an amount of a methanol component disposed in a methanol tub of the reformer and an amount of a hydrogen component disposed in a hydrogen storage device of the reformer.

For example, when the temperature of the reformer corresponds to a recombination pre-determined temperature, the amount of the methanol component disposed in the methanol tub corresponds to a pre-determined methanol amount and the amount of the hydrogen component disposed in the hydrogen storage device corresponds to a pre-determined hydrogen amount, it represents that the operation status of the reformer corresponds to the second pre-determined condition. Alternatively, when at least one of the temperature of the reformer does not correspond to the recombination pre-determined temperature, the amount of the methanol component disposed in the methanol tub does not correspond to the pre-determined methanol amount and the amount of the hydrogen component disposed in the hydrogen storage device does not correspond to the pre-determined hydrogen amount, it represents that the operation status of the reformer does not correspond to the second pre-determined condition.

When the operation status does not correspond to the second pre-determined condition, error information is sent (step S331) and the reformer is de-activated (step S332). In one embodiment, the error information is transmitted to a remote terminal via the remote unit or displayed in a monitor. In other embodiments, step S331 can be omitted.

When the operation status corresponds to the second pre-determined condition, it is determined whether the reformer corresponds to a turning off condition (step S360). In one embodiment, in step S360 is to determine whether the amount of the hydrogen component disposed in the hydrogen storage device of the reformer corresponds to a hydrogen condition. In one embodiment, the hydrogen condition is a maximum hydrogen storage amount of the hydrogen storage device. When the amount of the hydrogen component disposed in the hydrogen storage device of the reformer corresponds to the hydrogen condition, it represents that the reformer corresponds to the turning off condition. Thus, the reformer is de-activated (step S370).

When the amount of the hydrogen component disposed in the hydrogen storage device of the reformer does not correspond to the hydrogen condition, it represents that the reformer does not correspond to the turning off condition, thus, the original step of the corresponding mode is executed. For example, if the recombination confirmed action is executed in a standby mode, when the reformer does not correspond to the turning off condition, the original step (S410) of the standby mode is executed. The operations of the power supplying system in the different modes are described in more detail below.

When the reformer does not be activated, it is determined whether the reformer needs to be activated (step S320). In one embodiment, in step S320 is to determine whether the amount of the hydrogen component disposed in the hydrogen storage device of the reformer corresponds to the hydrogen condition. When the amount of the hydrogen component disposed in the hydrogen storage device of the reformer corresponds to the hydrogen condition, it represents that the reformer does not need to be activated. When the amount of the hydrogen component disposed in the hydrogen storage device of the reformer does not correspond to the hydrogen condition, it represents that the reformer needs to be activated.

When the reformer does not need to be activated, the temperature of the reformer is controlled (step S321) and the situation is avoided where the reformer is oxidized (step S322). When the reformer needs to be activated, it is determined whether the operation status of the reformer corresponds to the second pre-determined condition (step S330). In this embodiment, the determining method of step S330 is the same as the determining method of step S350, thus, the description of the determining method of step S350 is omitted. When the operation status does not correspond to the second pre-determined condition, error information is sent (step S331) and the reformer is de-activated (step S332). When the operation status corresponds to the second pre-determined condition, the reformer is activated (step S340). In one embodiment, the elements in the reformer are sequentially activated. The elements may comprise a methanol pump, an electromagnetic valve, a heat converter, an ignition, a burner and so forth.

Then, it is determined again whether the operation status corresponds to the second pre-determined condition (step S350). When the operation status does not correspond to the second pre-determined condition, error information is sent (step S331) and the reformer is de-activated (step S332). When the operation status corresponds to the second pre-determined condition, it is determined whether the reformer corresponds to a turning off condition (step S360). When the reformer corresponds to the turning off condition, the reformer is de-activated (step S370).

Figure 4:
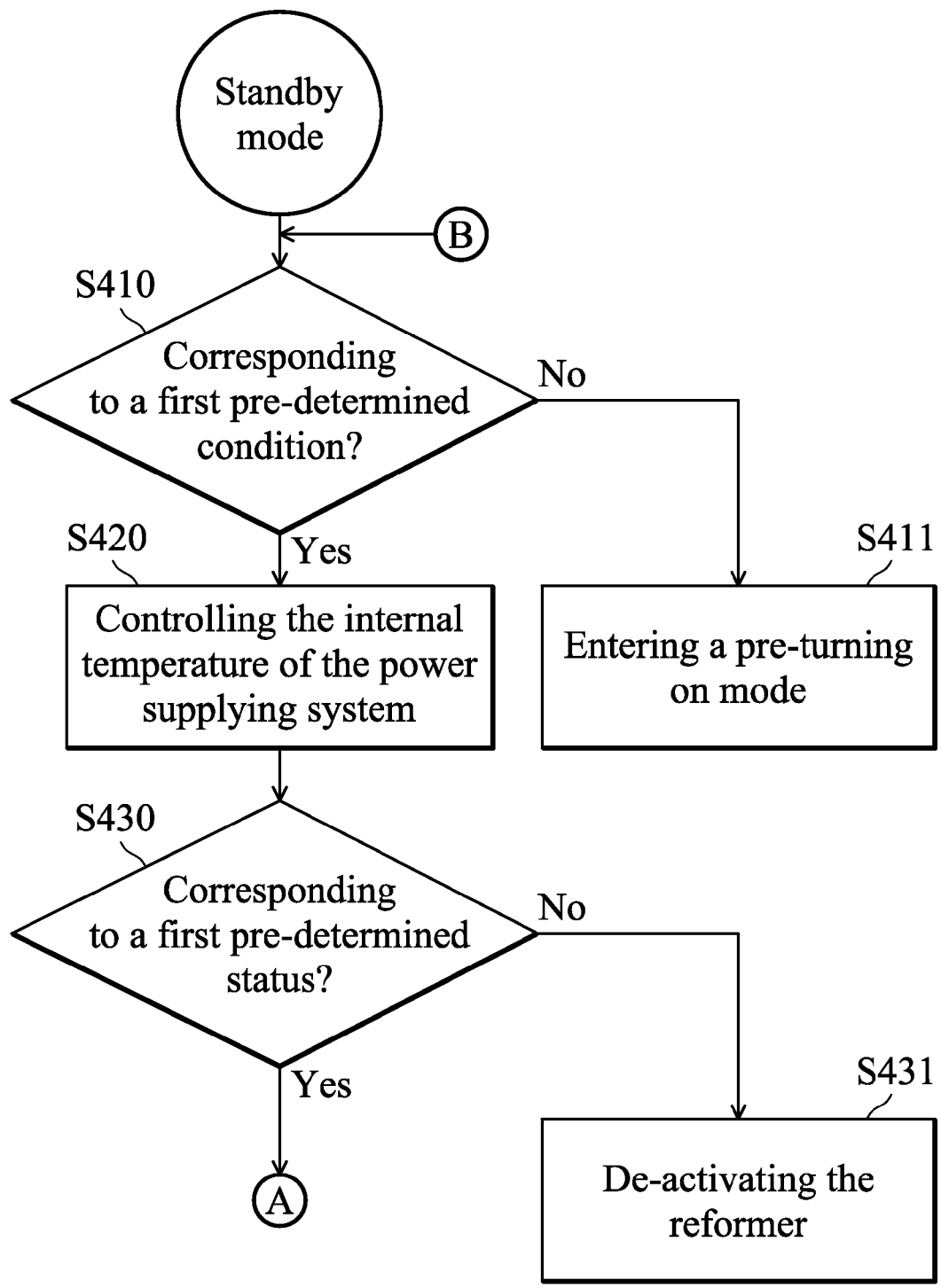
FIG. 4 is a schematic diagram of an exemplary embodiment of a standby mode.

FIG. 4 is a schematic diagram of an exemplary embodiment of a standby mode. First, it is determined whether the city energy corresponds to a first pre-determined condition (step S410). When the city energy does not correspond to the first pre-determined condition, it represents that the city energy is unstable. Thus, a pre-turning on mode is entered (step S411). When the city energy corresponds to the first pre-determined condition, it represents that the city energy is stable, thus, the internal temperature of the power supplying system is controlled (step S420). In one embodiment, in step S420 is to control the temperature of a cooling water of the fuel cell unit 240.

Then, it is determined whether a recombination status of the reformer corresponds to a first pre-determined status (step S430). In one embodiment, in step S430 is to determine at least one of an operation of a fan, a hydrogen concentration status and a temperature status. For example, when an operation status of a hydrogen concentration protection device of the recombination unit is abnormal, the hydrogen concentration in the recombination unit may be too high. Thus, the operation of the hydrogen concentration protection device is detected to determine whether the recombination status of the reformer corresponds to the first pre-determined status.

When the recombination status does not correspond to the first pre-determined status, error information is sent and the reformer is de-activated (step S431). In another embodiment, no error information is sent and only the reformer is de-activated. When the recombination status corresponds to the first pre-determined status, the recombination confirmed action shown in FIG. 3 is executed.

Figure 5:
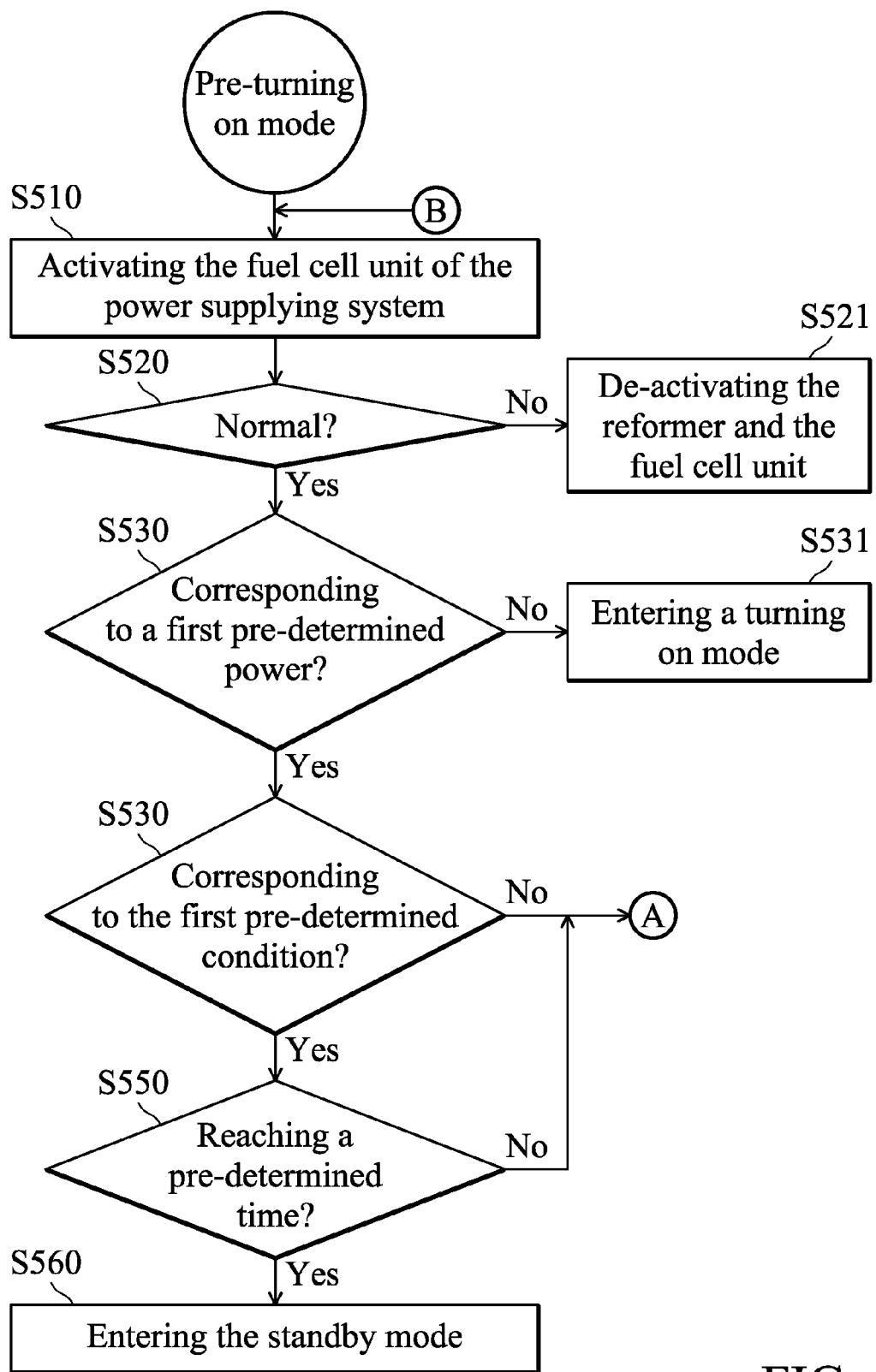
FIG. 5 is a schematic diagram of an exemplary embodiment of a pre-turning on mode.

FIG. 5 is a schematic diagram of an exemplary embodiment of a pre-turning on mode. During the pre-turning on mode, the fuel cell unit of the power supplying system is activated (step S510). In one embodiment, in step S510, the detectors 244~246 of the fuel cell unit 240, the hydrogen concentration protection device 247 and the cooling water supply device 241 are activated.

Then, it is determined whether the operation statuses of the recombination unit and the fuel cell unit are normal (step S520). In one embodiment, in step S520, whether the recombination status of the recombination unit corresponds to the first pre-determined status and a fuel status of the fuel cell unit corresponds to a second pre-determined status, are determined. When the recombination status does not correspond to the first pre-determined status or the fuel status does not correspond to the second pre-determined status, the reformer and the fuel cell unit are de-activated (step S521). In one embodiment, in step S521, the detectors 244~246 of the fuel cell unit 240, the hydrogen concentration protection device 247 and the cooling water supply device 241 are de-activated. In other embodiments, when the reformer is de-activated, error information is sent.

When the recombination status corresponds to the first pre-determined status and the fuel status corresponds to the second pre-determined status, it is determined whether a power of a power storage device of the power supplying system corresponds to a first pre-determined power (step S530). When the power of a power storage device does not correspond to the first pre-determined power, a turning on mode is entered into (step S531) to make the power storage device have enough power. When the power of a power storage device corresponds to the first pre-determined power, it is determined whether the city energy corresponds to the first pre-determined condition (step S540).

When the city energy does not correspond to the first pre-determined condition, the recombination confirmed action shown in FIG. 3 is executed. When the city energy corresponds to the first pre-determined condition, it is determined whether the duration time corresponding to the first pre-determined condition has reached a pre-determined time (step S550). When the duration time has reached the pre-determined time, it represents that the city energy is stable. Thus, the fuel cell unit is de-activated and the standby mode is entered (step S560). When the duration time has not reached the pre-determined time, the recombination confirmed action is executed.

Figure 6A:
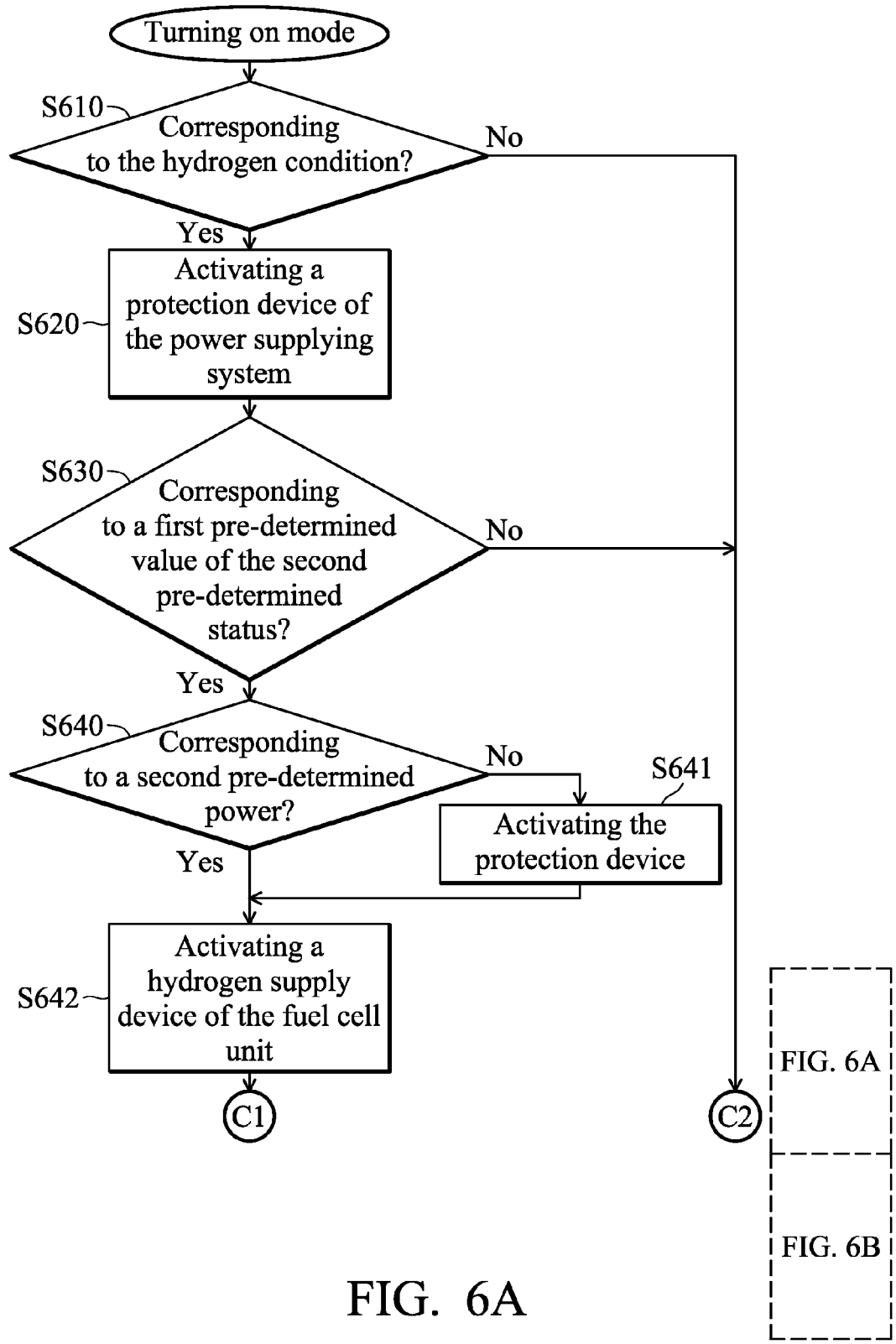
FIG. 6A~6B are schematic diagrams of an exemplary embodiment of a turning on mode.

FIG. 6A is a schematic diagram of an exemplary embodiment of a turning on mode. During the turning on mode, it is determined whether the amount of the hydrogen component disposed in the hydrogen storage device corresponds to the hydrogen condition (step S610). In one embodiment, the hydrogen condition described in step S610 is a minimum hydrogen amount, such as a minimum amount required by the fuel cell unit.

Figure 6B:
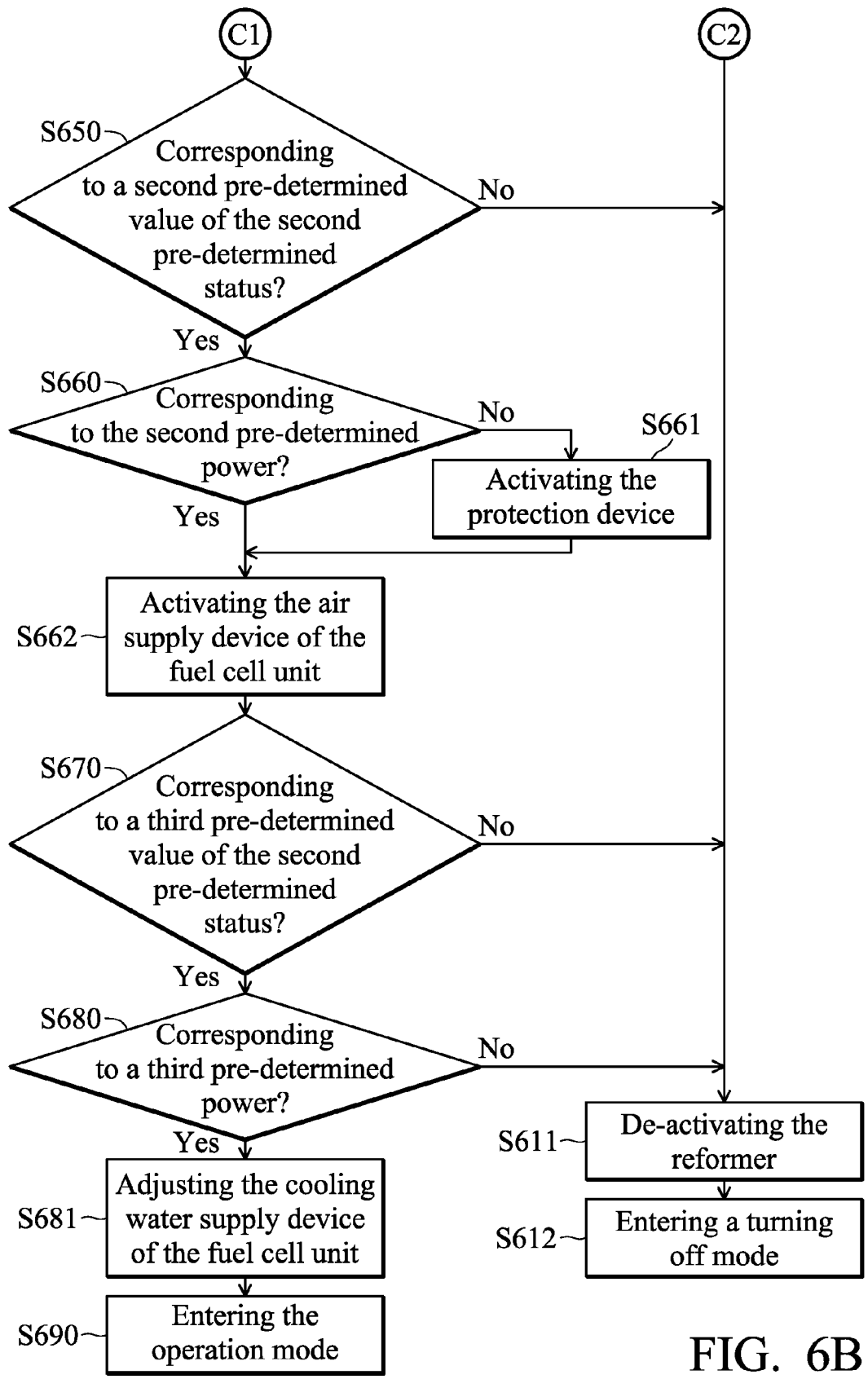

Refer to FIG. 6B, when the amount of the hydrogen component disposed in the hydrogen storage device does not correspond to the hydrogen condition, the reformer is de-activated (step S611) and a turning off mode is entered (step S612). Refer to FIG. 6A, when the amount of the hydrogen component disposed in the hydrogen storage device corresponds to the hydrogen condition, a protection device of the power supplying system is activated (step S620). In one embodiment, the protection device is a relay connected to a power source, an over-current protection element, or a discharging resistor.

Then, it is determined whether a water status of the fuel status corresponds to a first pre-determined value of the second pre-determined status (step S630). In one embodiment, in step S630, whether a main cooling water loop of the cooling water supply device of the fuel cell unit is normal is determined.

When the water status does not correspond to the first pre-determined value, it represents that the cooling water supply device of the fuel cell unit is abnormal. Thus, the reformer is de-activated (step S611) and the turning off mode is entered (step S612). When the water status corresponds to the first pre-determined value, it represents the cooling water supply device of the fuel cell unit is normal. Thus, it is determined whether the power generated by the fuel cell unit corresponds to a second pre-determined power (step S640).

When the power generated by the fuel cell unit does not correspond to the second pre-determined power, the protection device is activated (step S641) and a hydrogen supply device of the fuel cell unit is activated (step S642). When the power generated by the fuel cell unit corresponds to the second pre-determined power, step S642 is executed.

Refer to FIG. 6B, it is determined whether a hydrogen status of the fuel status corresponds to a second pre-determined value of the second pre-determined status (step S650). When the hydrogen status does not correspond to the second pre-determined value, the reformer is de-activated (step S611) and the turning off mode is entered (step S612). When the hydrogen status corresponds to the second pre-determined value, it is determined whether the power generated by the fuel cell unit corresponds to the second pre-determined power (step S660).

When the power generated by the fuel cell unit does not correspond to the second pre-determined power, the protection device is again activated (step S661) and the air supply device of the fuel cell unit is activated (step S662). When the power generated by the fuel cell unit corresponds to the second pre-determined power, step S662 is executed.

Next, it is determined whether an air status of the fuel status corresponds to a third pre-determined value of the second pre-determined status (step S670). When the air status does not correspond to the third pre-determined value, the reformer is de-activated (step S611) and the turning off mode is entered (step S612). When the air status corresponds to the third pre-determined value, it is determined whether the power generated by the fuel cell unit corresponds to a third pre-determined power (step S680).

When the power generated by the fuel cell unit does not correspond to the third pre-determined power, the reformer is de-activated (step S611) and the turning off mode is entered (step S612). When the power generated by the fuel cell unit corresponds to the third pre-determined power, the cooling water supply device of the fuel cell unit is adjusted (step S681) and the operation mode is entered (step S690). In one embodiment, in step S681, a sub-cooling water loop of the cooling water supply device is adjusted.

Figure 7A:
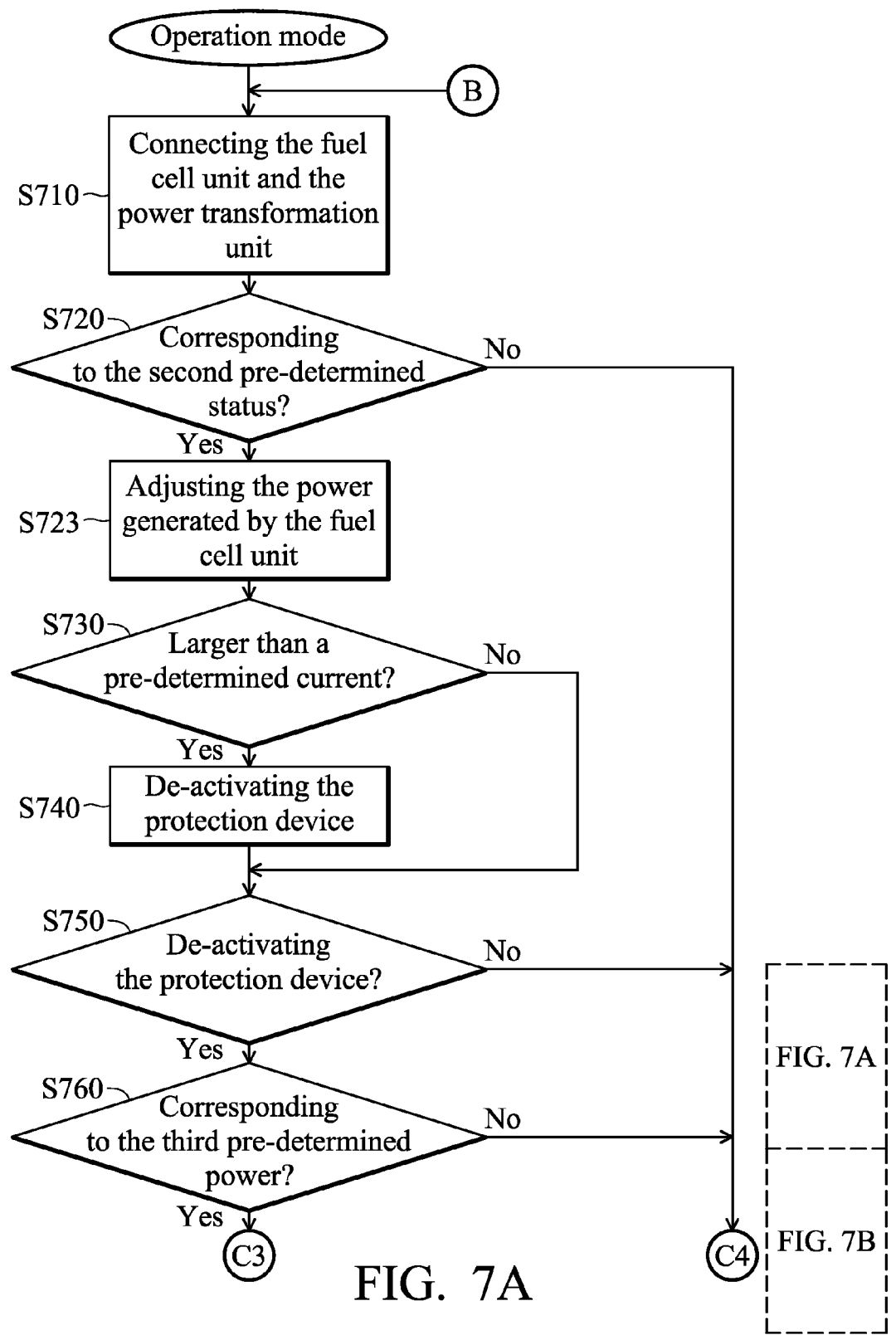
FIG. 7A~7B are schematic diagrams of an exemplary embodiment of the operation mode.
Figure 7B:
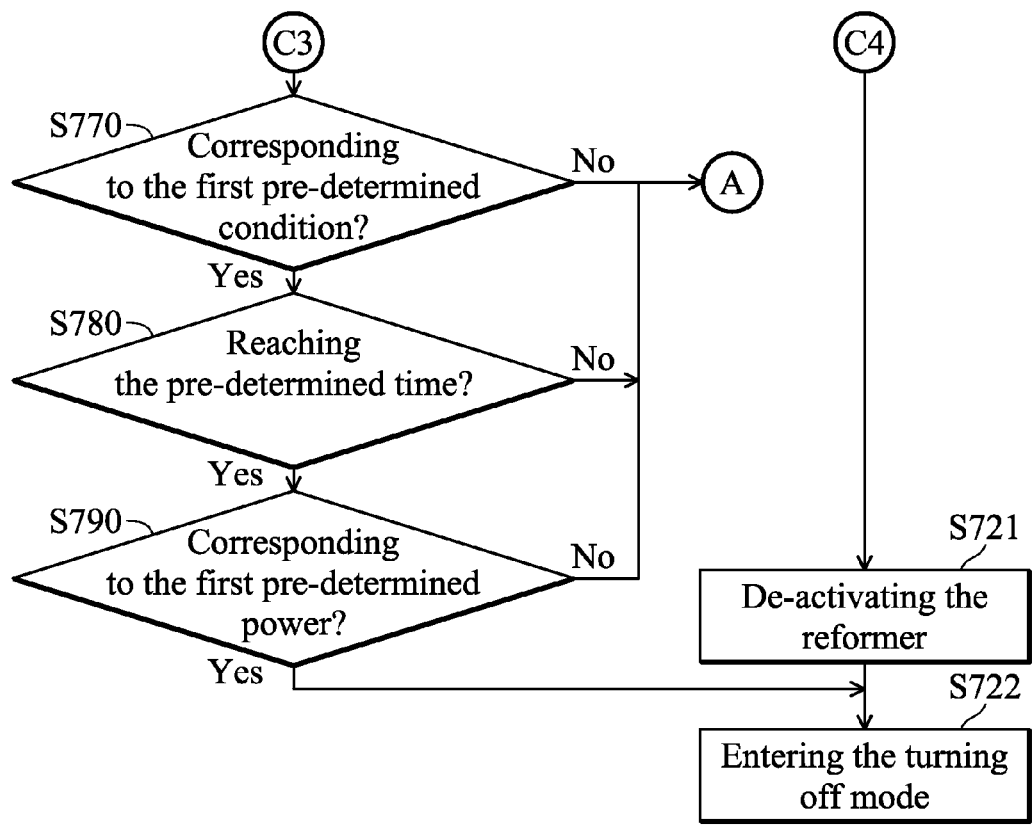

FIG. 7A is a schematic diagram of an exemplary embodiment of the operation mode. During the operation mode, the fuel cell unit is coupled to the power transformation unit (step S710) and it is determined whether the fuel status corresponds to the second pre-determined status (step S720). In one embodiment, in step S720, the operation status of an air line of the fuel cell unit is determined. The air line transmits an air component. When the pressure of the air line is less than a pre-determined pressure, it represents that the fuel status does not correspond to the second pre-determined status. Refer to FIG. 7B, the reformer is de-activated (step S721) and the turning off mode is entered (step S722).

Refer to FIG. 7A, when the pressure of the air line is larger than the pre-determined pressure, it represents that the fuel status corresponds to the second pre-determined status. Thus, the power generated by the fuel cell unit is adjusted according to the status of the load (step S723) and it is determined whether an output current of the fuel cell unit is larger than a pre-determined current (step S730). When the output current of the fuel cell unit is larger than the pre-determined current, the protection device is de-activated (step S740) and controls each supply device of the fuel cell unit to adjust the hydrogen, the cooling water and the air provided to the cell stack (step S750). When the output current of the fuel cell unit is not larger than the pre-determined current, step S750 is executed.

Figure 7C:
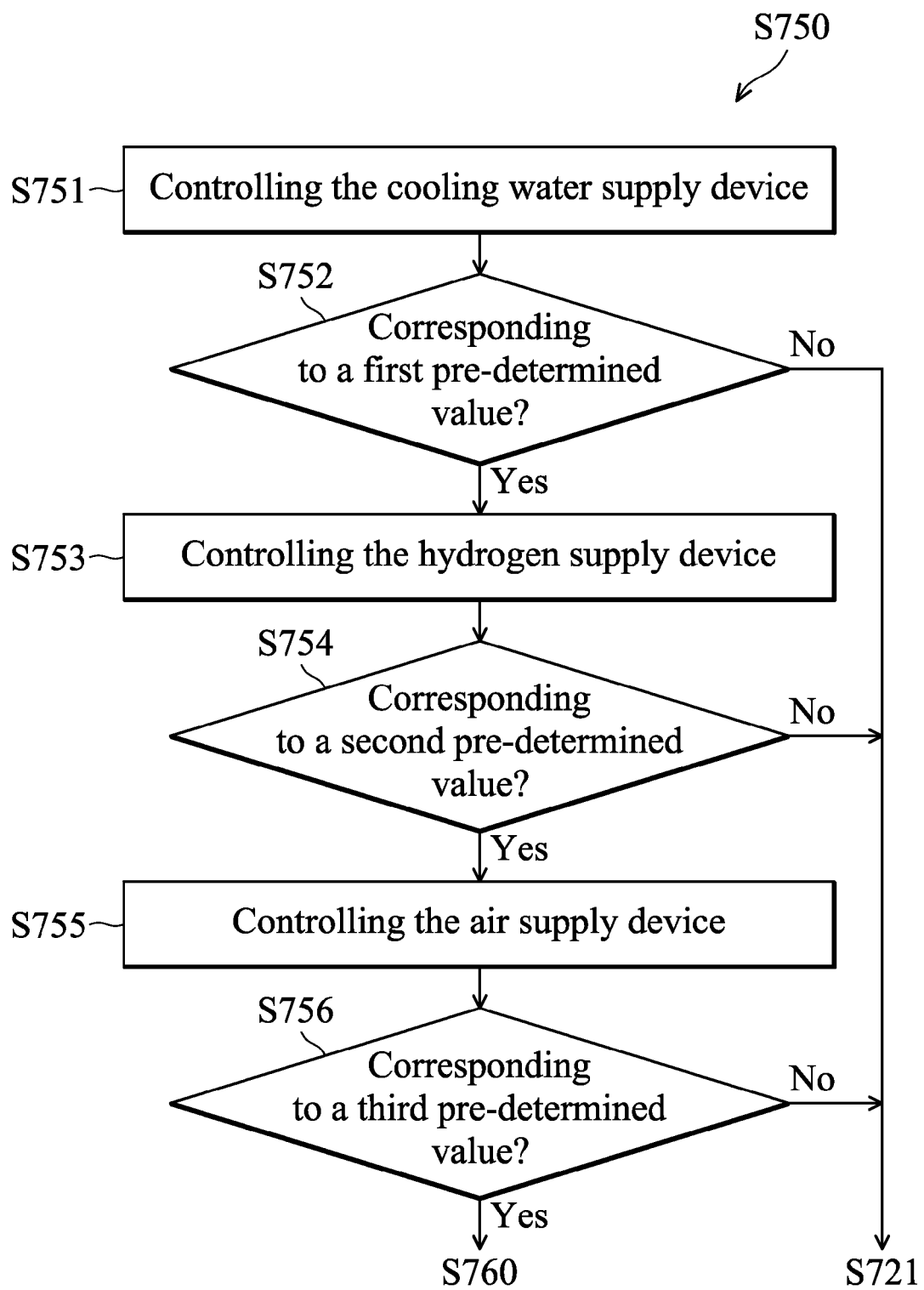
FIG. 7C is a schematic diagram of an exemplary embodiment of controlling each supply device.

The invention does not limit how each supply device is controlled in step S750. FIG. 7C is a schematic diagram of an exemplary embodiment of controlling each supply device. In this embodiment, the cooling water supply device of the fuel cell unit 240 is controlled according to the load (step S751) to adjust the cooling water received by the cell stack. Then, it is determined whether a water status of the fuel cell unit corresponds to a first pre-determined value (step S752). The first pre-determined value in step S752 is the same as the first pre-determined value in step S630.

When the water status of the fuel cell unit does not correspond to the first pre-determined value, step S721 is executed. When the water status of the fuel cell unit corresponds to the first pre-determined value, the hydrogen supply device of the fuel cell unit 240 is controlled according to the load (step S753) to adjust the hydrogen received by the cell stack 249. Next, it is determined whether the hydrogen status of the fuel cell unit corresponds to a second pre-determined value (step S754). The second pre-determined value in step S754 is the same as the second pre-determined value in step S650.

When the hydrogen status does not correspond to the second pre-determined value, step S721 is executed. When the hydrogen status corresponds to the second pre-determined value, the air supply device of the fuel cell unit 240 is controlled according to the load (step S755) to adjust the air received by the cell stack 249. Then, it is determined whether the air status of the fuel cell unit corresponds to a third pre-determined value (step S756). The third pre-determined value in step S756 is the same as the third pre-determined value in step S670.

When the air status of the fuel cell unit does not correspond to the third pre-determined value, step S721 is executed. When the air status of the fuel cell unit corresponds to the third pre-determined value, step S760 is executed.

The invention does not limit the sequence of executing steps S751, S753 and S755. In this embodiment, the cooling water supply device, the hydrogen supply device and the air supply device are sequentially adjusted, but the disclosure is not limited thereto. In other embodiments, the cooling water supply device, the hydrogen supply device and the air supply device are adjusted according to other sequences.

Refer to FIG. 7A, after executing step S750, it is determined whether the power generated by the fuel cell unit corresponds to the third pre-determined power (step S760) to confirm whether the power generated by the fuel cell unit is normal. Refer to FIG. 7B, when the power generated by the fuel cell unit does not correspond to the third pre-determined power, the reformer is de-activated (step S721) and the turning off mode is entered (step S722). When the power generated by the fuel cell unit corresponds to the third pre-determined power, it is determined whether the city energy corresponds to the first pre-determined condition (step S770).

Refer to FIG. 7B, when the city energy does not correspond to the first pre-determined condition, the recombination confirmed action shown in FIG. 3 is executed. When the city energy corresponds to the first pre-determined condition, it is determined whether the duration time corresponding to the first pre-determined condition has reached the pre-determined time (step S780). When the duration time has not reached the pre-determined time, the recombination confirmed action shown in FIG. 3 is executed. When the duration time has reached the pre-determined time, it is determined whether the power of the power storage device corresponds to the first pre-determined power (step S790). When the power of the power storage device does not correspond to the first pre-determined power, the recombination confirmed action shown in FIG. 3 is executed. When the power of the power storage device corresponds to the first pre-determined power, the turning off mode is entered (step S722).

Figure 8A:
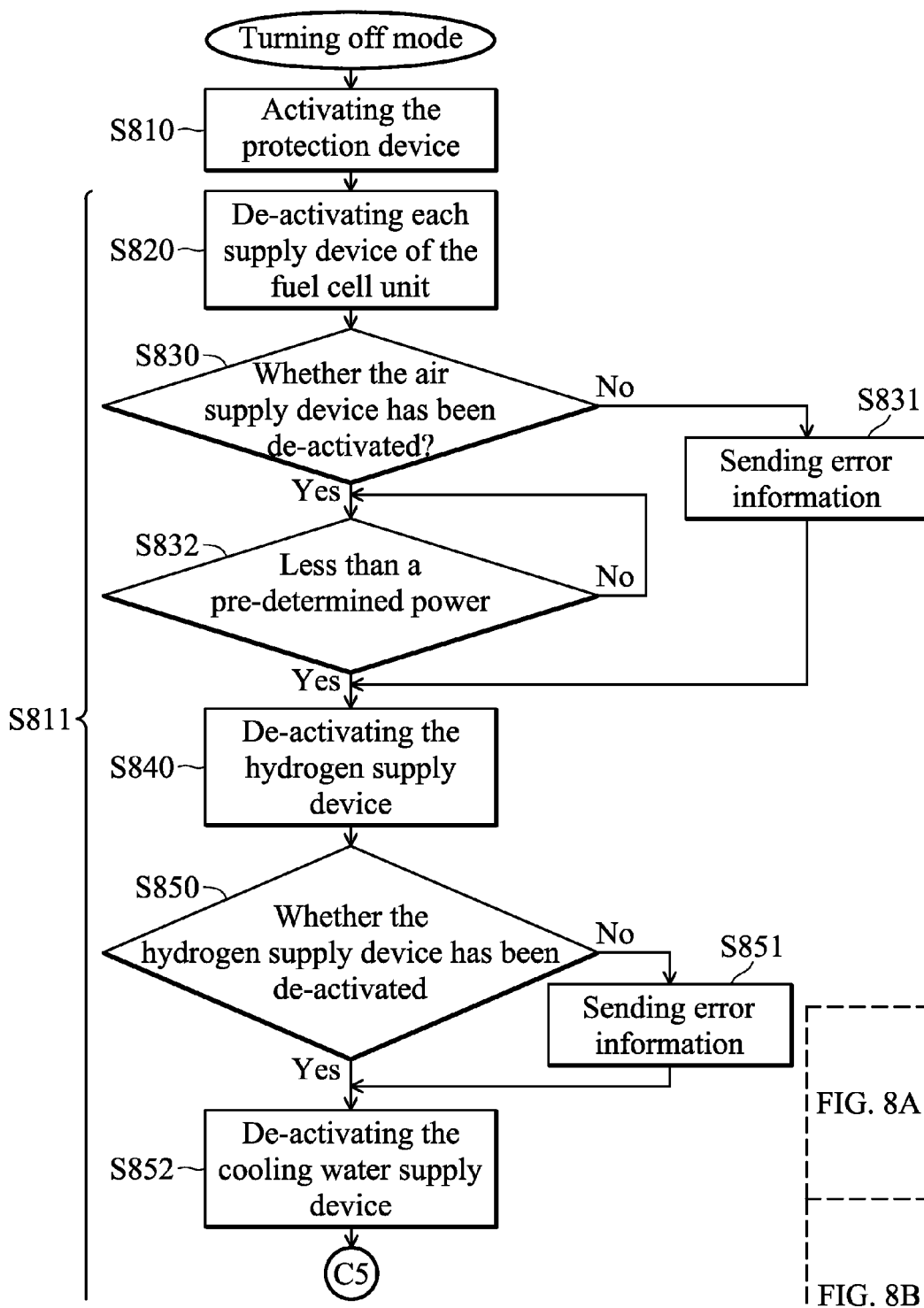
FIG. 8A~8B are schematic diagrams of an exemplary embodiment of a turning off mode.
Figure 8B:
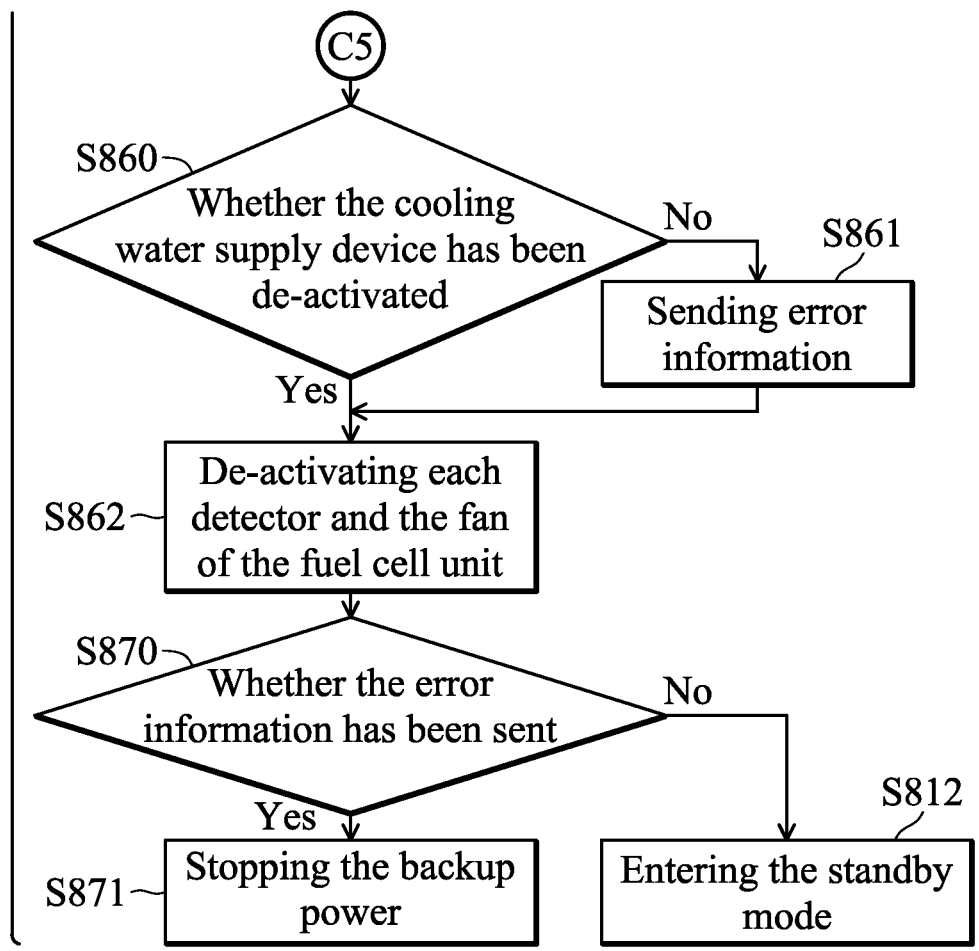

FIGS. 8A and 8B are schematic diagrams of an exemplary embodiment of a turning off mode. During the turning off mode, the protection device is activated (step S810), each supply device of the fuel cell unit is de-activated (step S811) and the standby mode is entered (step S812). The invention does not limit the sequence of de-activating each supply device. In this embodiment, the air supply device, the hydrogen supply device and the cooling water supply device are sequentially de-activated. In other embodiments, each supply device is de-activated according to other sequences.

In this embodiment, the air supply device is first de-activated (step S820) and it is determined whether the air supply device has been de-activated (step S830). When the air supply device has not been de-activated, error information is sent (step S831) and then the hydrogen supply device has been de-activated (step S840). When the air supply device has been de-activated, it is determined whether the power generated by the fuel cell unit is less than a pre-determined power (step S832).

When the power generated by the fuel cell unit is less than the pre-determined power, the hydrogen supply device has been de-activated (step S840). Then, it is determined whether the hydrogen supply device has been de-activated (step S850). When the hydrogen supply device has not been de-activated, error information is sent (step S851) and then the cooling water supply device is de-activated (step S852). In one embodiment, in step S852, a cooling water loop is turned off. When the hydrogen supply device has been de-activated, the cooling water supply device is de-activated (step S852).

Refer to FIG. 8B, it is determined whether the cooling water supply device has been de-activated (step S860). When the cooling water supply device has not been de-activated, error information is sent (step S861) and then each detector and the fan of the fuel cell unit are de-activated (step S862). When the cooling water supply device has been de-activated, each detector and the fan of the fuel cell unit are de-activated (step S862).

Next, it is determined whether the error information has been sent (step S870). When the error information has been sent, the error information is displayed and the backup power $V_{SUB}$ is stopped (step S871). As shown in FIG. 2A, when the city energy is unstable, a backup power is provided to the load. However, when the error information occurs, it represents that the backup power is abnormal. Thus, the backup power is stopped from being provided to the load. In other words, the operations of units 230~260 are stopped until an abnormal status is eliminated. In one embodiment, after eliminating the abnormal status, a tester cuts off the power of the units 230~260 and then provides the power to the units 230~260. When the error information has not been sent, the standby mode is entered (step S812).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A power controlling method for a power supplying system coupled to a load, comprising:
    detecting an energy;
    determining whether the energy corresponds to a first pre-determined condition;

transforming the energy to generate a main power to the load when the energy corresponds to the first pre-determined condition;

activating a fuel cell unit to provide a backup power to the load when the energy does not correspond to the first pre-determined condition; and executing a recombination confirmed action in a standby mode, a pre-turning on mode and an operation mode, wherein the recombination confirmed action comprises:

determining whether a reformer of the power supplying system is activated;

determining whether an operation status of the reformer corresponds to a second pre-determined condition when the reformer is activated, wherein when the operation status does not correspond to the second pre-determined condition, the reformer is de-activated, and when the operation status corresponds to the second pre-determined condition, it is determined whether the reformer corresponds to a turning off condition, and when the reformer corresponds to the turning off condition, the reformer is de-activated; and determining whether the reformer needs to be activated when the reformer is not activated, wherein when the reformer does not need to be activated, a temperature of the reformer is controlled and a situation is avoided where the reformer is oxidized, and when the reformer needs to be activated, it is determined whether the operation status corresponds to the second pre-determined condition, and when the operation status does not correspond to the second pre-determined condition, the reformer is de-activated, and when the operation status corresponds to the second pre-determined condition, the reformer is turned on and it is again determined whether the operation status corresponds to the second pre-determined condition, and when the operation status does not correspond to the second pre-determined condition, the reformer is de-activated, and when the operation status still corresponds to the second pre-determined condition, it is determined whether the operation status corresponds to the second pre-determined condition, and when the reformer corresponds to the turning off condition, the reformer is de-activated.

2. The power controlling method as claimed in claim 1, wherein the step of determining whether the reformer corresponds to the turning off condition is to determine whether an amount of a hydrogen component disposed in a hydrogen storage device of the reformer corresponds to a hydrogen condition, wherein when the amount of the hydrogen component disposed in the hydrogen storage device of the reformer corresponds to the hydrogen condition, it represents that the reformer corresponds to the turning off condition, and when the amount of the hydrogen component disposed in the hydrogen storage device of the reformer does not correspond to the hydrogen condition, it represents that the reformer does not correspond to the turning off condition, wherein the step of determining whether the reformer needs to be activated is to determine whether the amount of the hydrogen component disposed in the hydrogen storage device of the reformer corresponds to the hydrogen condition, and when the amount of the hydrogen component disposed in the hydrogen storage device of the reformer corresponds to the hydrogen condition, it represents that the reformer does not need to be activated, and when the amount of the hydrogen component disposed in the hydrogen storage device of the reformer does not correspond to the hydrogen condition, it represents that the reformer needs to be activated, wherein the step of determining whether the operation status corresponds to the second pre-determined condition is to determine at least one of the temperature of the reformer, an amount of methanol component disposed in a methanol tub of the reformer, and the amount of hydrogen component disposed in the hydrogen tub of the reformer.

3. The power controlling method as claimed in claim 2, during the standby mode, further comprising:

determining whether the energy corresponds to the first pre-determined condition;

entering the pre-turning on mode, when the energy does not correspond to the first pre-determined condition;

controlling an internal temperature of the power supplying system and determining whether a recombination status of the reformer corresponds to a first pre-determined status when the energy corresponds to the first pre-determined condition;

de-activating the reformer when the recombination status does not correspond to the first pre-determined status; and executing the recombination confirmed action when the recombination status corresponds to the first pre-determined status, wherein the recombination status is at least one of an operation status of a fan, a hydrogen concentration status and a temperature status.

4. The power controlling method as claimed in claim 3, wherein the step of determining whether the recombination status corresponds to the first pre-determined status is to determine whether an operation of a hydrogen concentration protection device of the reformer is normal.

5. The power controlling method as claimed in claim 3, during the pre-turning on mode, further comprising:

activating a fuel cell unit of the power supplying system and determining whether the recombination status corresponds to the first pre-determined status and a fuel status of the fuel cell unit corresponds to a second pre-determined status, de-activating the reformer and the fuel cell unit when the recombination status does not correspond to the first pre-determined status or the fuel status of the fuel cell unit does not correspond to the second pre-determined status, determining whether a power of a power storage device of the power supplying system corresponds to a first pre-determined power when the recombination status corresponds to the first pre-determined status and the fuel status of the fuel cell unit corresponds to the second pre-determined status;

entering a turning on mode when the power of the power storage device does not correspond to the first pre-determined power;

determining whether the energy corresponds to the first pre-determined condition when power of the power storage device corresponds to the first pre-determined power;

executing the recombination confirmed action when the energy does not correspond to the first pre-determined condition; and de-activating the fuel cell unit and entering the standby mode when the energy corresponds to the first pre-determined condition.

6. The power controlling method as claimed in claim 5, during the turning on mode, further comprising:
determining whether the amount of the hydrogen component disposed in the hydrogen storage device corresponds to the hydrogen condition;
de-activating the reformer and entering a turning off mode when the amount of the hydrogen component disposed in the hydrogen storage device does not correspond to the hydrogen condition;
activating a protection device of the power supplying system and determining whether a water status of the fuel status corresponds to a first pre-determined value of the second pre-determined status when the amount of the hydrogen component disposed in the hydrogen storage device corresponds to the hydrogen condition;
de-activating the reformer and entering the turning off mode when the water status does not correspond to the first pre-determined value;
determining whether a power generated by the fuel cell unit is less than a second pre-determined power when the water status corresponds to the first pre-determined value;
activating the protection device again and adjusting a hydrogen supply device of the fuel cell unit when the power generated by the fuel cell unit is not less than the second pre-determined power;
adjusting the hydrogen supply device and determining whether a hydrogen status of the fuel status corresponds to a second pre-determined value of the second pre-determined status when the power generated by the fuel cell unit is less than the second pre-determined power;
de-activating the reformer and entering the turning off mode when the hydrogen status does not correspond to the second pre-determined value;
determining whether the power generated by the fuel cell unit is less than the second pre-determined power when the hydrogen status corresponds to the second pre-determined value;
activating the protection device again and adjusting an air supply device of the fuel cell unit when the power generated by the fuel cell unit is not less than the second pre-determined power;
adjusting the air supply device and determining whether an air status of the fuel status corresponds to a third pre-determined value of the second pre-determined status when the power generated by the fuel cell unit is less than the second pre-determined power;
de-activating the reformer and entering the turning off mode when the air status does not correspond to the third pre-determined value;
determining whether the power generated by the fuel cell unit corresponds to a third pre-determined power when the air status corresponds to the third pre-determined value;
de-activating the reformer and entering the turning off mode when the power generated by the fuel cell unit does not correspond to the third pre-determined power; and
adjusting a cooling water supply device of the fuel cell unit and entering the operation mode when the power generated by the fuel cell unit corresponds to the third pre-determined power.

7. The power controlling method as claimed in claim 6, during the operation mode, further comprising:
connecting the fuel cell unit to a power transformation unit and determining whether the fuel status corresponds to the second pre-determined status;
de-activating the reformer and entering the turning off mode when the fuel status does not correspond to the second pre-determined status; and
adjusting the power generated by the fuel cell unit according to the load when fuel status corresponds to the second pre-determined status;
determining whether an output current of the fuel cell unit is larger than a pre-determined current;
de-activating the protection device, and controlling the hydrogen supply device, the air supply device and the cooling water supply device according to the load, and determining whether the fuel status corresponds to the second pre-determined status when the output current of the fuel cell unit is larger than the pre-determined current;
controlling the hydrogen supply device, the air supply device and the cooling water supply device according to the load and determining whether the fuel status corresponds to the second pre-determined status when the output current of the fuel cell unit is not larger than the pre-determined current;
de-activating the reformer and entering the turning off mode when the fuel status does not correspond to the second pre-determined status;
determining whether the power generated by the fuel cell unit corresponds to the third pre-determined power when the fuel status corresponds to the second pre-determined status;
de-activating the reformer and entering the turning off mode when the power generated by the fuel cell unit does not correspond to the third pre-determined power;
determining whether the power generated by the fuel cell unit corresponds to the first pre-determined power when the power generated by the fuel cell unit corresponds to the third pre-determined power, wherein when the power generated by the fuel cell unit corresponds to the first pre-determined power, the turning off mode is entered,
determining whether the energy corresponds to the first pre-determined condition and the power of the power storage device corresponds to the first pre-determined power; and
executing the recombination confirmed action when the energy does not correspond to the first pre-determined condition or the power of the power storage device does not correspond to the first pre-determined power.

8. The power controlling method as claimed in claim 7, wherein the step of determining whether the fuel status corresponds to the second pre-determined status is to determine whether the water status corresponds to the first pre-determined value, the hydrogen status corresponds to the second pre-determined value, and the air status corresponds to the third pre-determined value,
wherein the reformer is de-activated and the turning off mode is entered when the water status does not correspond to the first pre-determined value, the hydrogen status does not correspond to the second pre-determined value, or the air status does not correspond to the third pre-determined value.

9. The power controlling method as claimed in claim 8, during the turning off mode, further comprising:
activating the protection device;

de-activating the hydrogen supply device, the air supply device and the water supply device of the fuel cell unit; and entering the standby mode.

* * * * *